(12) United States Patent
Saita et al.

(10) Patent No.: US 12,742,508 B2
(45) Date of Patent: Sep. 22, 2026

(54) HOSE FOR CONVEYING REFRIGERANT

(71) Applicant: THE YOKOHAMA RUBBER CO., LTD., Hiratsuka (JP)

(72) Inventors: Tomohide Saita, Hiratsuka Shi (JP); Kenta Wakabayashi, Hiratsuka Shi (JP); Shun Sato, Hiratsuka Shi (JP)

(73) Assignee: The Yokohama Rubber Co., Ltd., Kanagawa (JP)

( * ) Notice: Subject to any disclaimer, the term of this patent is extended or adjusted under 35 U.S.C. 154(b) by 377 days.

(21) Appl. No.: 18/576,417

(22) PCT Filed: May 31, 2022

(86) PCT No.: PCT/JP2022/022108

§ 371 (c)(1),
(2) Date: Jan. 4, 2024

(87) PCT Pub. No.: WO2023/007940

PCT Pub. Date: Feb. 2, 2023

(65) Prior Publication Data

US 2024/0309974 A1 Sep. 19, 2024

(30) Foreign Application Priority Data

Jul. 29, 2021 (JP) ................................ 2021-124601

(51) Int. Cl.
*F16L 11/08* (2006.01)
*B32B 1/08* (2006.01)
(Continued)

(52) U.S. Cl.
CPC .............. *F16L 11/082* (2013.01); *B32B 1/08* (2013.01); *B32B 25/14* (2013.01); *F16L 11/04* (2013.01);
(Continued)

(58) Field of Classification Search
CPC .. F16L 11/082; F16L 11/085; F16L 2011/047; F16L 11/04; F16L 11/08;
(Continued)

(56) References Cited

U.S. PATENT DOCUMENTS 3,037,954 A 6/1962 Gessler et al.
3,881,521 A 5/1975 Johansen et al.
(Continued)

FOREIGN PATENT DOCUMENTS

CN 1212041 A 3/1999
CN 1409745 A * 4/2003 ........... B32B 27/365
(Continued)

OTHER PUBLICATIONS

WO 2021/153079, English translation (Year: 2026).*

*Primary Examiner* — Dominick L Plakkoottam
(74) *Attorney, Agent, or Firm* — Carrier, Shende & Associates P.C.; Joseph P. Carrier; Fulchand P. Shende

(57) ABSTRACT

A hose for conveying a refrigerant having an inner surface layer that includes a thermoplastic resin composition with a sea-island structure or a thermoplastic resin, an outer surface layer that includes a thermoplastic resin composition having a sea-island structure, and a reinforcing layer. An oxygen permeability coefficient at a temperature of 21° C. and a relative humidity of 50% of the thermoplastic resin composition or the thermoplastic resin of the inner surface layer is 0.05 $cm^3 \cdot mm/(m^2 \cdot day \cdot mmHg)$ or less. A water vapor permeability coefficient at a temperature of 60° C. and a relative humidity of 100% of the thermoplastic resin composition of the outer surface layer is 10.0 $g \cdot mm/(m^2 \cdot 24\ h)$ or less. The reinforcing layer includes an organic fiber with an inclination angle of 49° or more and 61° or less.

6 Claims, 3 Drawing Sheets

(51) Int. Cl.

| | |
|---|---|
| ***B32B 25/14*** | (2006.01) |
| ***F16L 11/04*** | (2006.01) |
| ***F25B 41/40*** | (2021.01) |

(52) U.S. Cl.

CPC ............. *F16L 11/08* (2013.01); *F16L 11/085* (2013.01); *F25B 41/40* (2021.01); *B32B 2597/00* (2013.01)

(58) Field of Classification Search

CPC . F25B 41/40; B32B 25/14; B32B 2262/0261; B32B 2262/0276; B32B 2307/732; B32B 2597/00; B32B 1/08; B32B 25/10; B32B 2307/7246; B32B 2307/7244; B32B 2305/08; B32B 2270/00; B32B 2274/00; B32B 2307/724; B32B 2250/03; B32B 27/08; B32B 2307/714; B32B 2307/558

See application file for complete search history.

(56) References Cited

U.S. PATENT DOCUMENTS

| | | | | |
|---|---|---|---|---|
| 4,130,534 A | | 12/1978 | Coran et al. | |
| 4,173,556 A | | 11/1979 | Coran et al. | |
| 4,987,017 A | | 1/1991 | Sato et al. | |
| 5,362,530 A | | 11/1994 | Kitami et al. | |
| 5,804,269 A | | 9/1998 | Ozawa et al. | |
| 5,910,544 A | * | 6/1999 | Ozawa | B60C 1/00 525/178 |
| 5,919,864 A | | 7/1999 | Watanabe et al. | |
| 6,009,910 A | | 1/2000 | Shibano | |
| 6,013,727 A | | 1/2000 | Dharmarajan et al. | |
| 6,062,269 A | | 5/2000 | Tanaka et al. | |
| 6,166,143 A | | 12/2000 | Watanabe et al. | |
| 6,626,219 B2 | | 9/2003 | Tracey et al. | |
| 7,585,914 B2 | | 9/2009 | Tsou et al. | |
| 7,709,575 B2 | | 5/2010 | Tsou et al. | |
| 8,129,453 B2 | | 3/2012 | Hara et al. | |
| 8,415,431 B2 | | 4/2013 | Ellul | |
| 2004/0134554 A1 | | 7/2004 | Okuyama | |
| 2006/0019048 A1 | * | 1/2006 | Nakano | F16L 27/11 428/36.91 |
| 2008/0255310 A1 | | 10/2008 | Tsou et al. | |
| 2008/0275187 A1 | | 11/2008 | Tsou et al. | |
| 2013/0216751 A1 | | 8/2013 | Mizutani et al. | |
| 2022/0325095 A1 | | 10/2022 | Tomoi | |

FOREIGN PATENT DOCUMENTS

| | | | | | |
|---|---|---|---|---|---|
| CN | 1498763 A | | 5/2004 | |
| EP | 0 361 769 A2 | | 4/1990 | |
| GB | 1 572 717 A | | 7/1980 | |
| JP | H01-286829 A | | 11/1989 | |
| JP | H06-294484 A | | 10/1994 | |
| JP | H06-294485 A | | 10/1994 | |
| JP | H09-143366 A | | 6/1997 | |
| JP | H10-0274362 A | | 10/1998 | |
| JP | 2001-235068 A | | 8/2001 | |
| JP | 2004019752 A | * | 1/2004 | D04C 1/06 |
| JP | 2013-155793 A | | 8/2013 | |
| JP | 2017116048 A | * | 6/2017 | B32B 7/022 |
| JP | 2018-025236 A | | 2/2018 | |
| JP | 2021116847 A | * | 8/2021 | F16L 11/06 |
| WO | 2008/039373 A1 | | 4/2008 | |
| WO | 2010/073375 A1 | | 7/2010 | |
| WO | 2021/054058 A1 | | 3/2021 | |
| WO | WO-2021153079 A1 | * | 8/2021 | C08L 77/02 |
| WO | WO-2022172723 A1 | * | 8/2022 | B32B 1/08 |

* cited by examiner

HOSE FOR CONVEYING REFRIGERANT

TECHNICAL FIELD

The present invention relates to a hose for conveying a refrigerant and particularly relates to a hose for conveying a refrigerant, the hose being used for an air conditioner installed in an automobile.

BACKGROUND ART

In recent years, one of the most important issues in automobiles is weight reduction due to regulations for reducing carbon dioxide emissions and the like. Accordingly, weight reduction of a hose to be used for an air conditioner that is installed in an automobile for conveying refrigerants is also required. Making an inner surface layer or an outer surface layer thin to reduce a hose weight is disadvantageous to ensure permeation resistance to a refrigerant conveyed by the hose (refrigerant permeation resistance) and permeation resistance to moisture outside the hose (moisture permeation resistance). Thus, by replacing an inner surface layer or an outer surface layer with a resin having permeation resistance superior to that of a rubber, it becomes possible to ensure adequate permeation resistance while the weight is reduced. Various hoses made of resin layers have been proposed (e.g., see Patent Document 1).

Because an air conditioner installed in an automobile is installed in a narrow and limited space, a hose for conveying a refrigerant preferably has good flexibility and is preferably easy to install even in a narrow space. However, when an inner surface layer or an outer surface layer is simply replaced with a resin to prioritize permeation resistance, flexibility of a hose is impaired.

A hose proposed in Patent Document 1 employs a resin layer having a sea-island structure including sea made of a particular type of resin and needle-shaped islands made of a particular type of resin to ensure flexibility of the hose and to ensure permeation resistance to a conveyed fluid (such as a fuel or a refrigerant). However, with such a configuration, the type of resin that can be used is extremely limited to ensure permeation resistance to moisture from outside the hose, or a layer thickness of the resin layer needs to be increased to ensure permeation resistance to a conveyed fluid or moisture from outside the hose. As a result, flexibility of the hose is impaired, and this works disadvantageously to weight reduction of the hose. Therefore, there's room for improvement of permeation resistance to a refrigerant conveyed by a hose and moisture outside the hose and to obtain a hose for conveying a refrigerant having a light weight and good flexibility.

CITATION LIST

Patent Document

Patent Document 1: JP 2013-155793 A

SUMMARY OF INVENTION

Technical Problem

An object of the present invention is to provide a hose for conveying a refrigerant, the hose having excellent permeation resistance to a refrigerant to be conveyed by the hose and moisture outside the hose and having a light weight, good flexibility, and excellent handleability.

Solution to Problem

A hose for conveying a refrigerant according to an embodiment of the present invention to achieve the object described above is a hose for conveying a refrigerant, the hose including: an inner surface layer and an outer surface layer disposed coaxially; and a reinforcing layer layered coaxially in between the inner surface layer and the outer surface layer, the inner surface layer including a thermoplastic resin composition or a thermoplastic resin, the thermoplastic resin composition having a sea-island structure including a matrix containing a thermoplastic resin and a domain containing an elastomer, the outer surface layer including a thermoplastic resin composition having a sea-island structure including a matrix containing a thermoplastic resin and a domain containing an elastomer, an oxygen permeability coefficient at a temperature of 21° C. and a relative humidity of 50% of the thermoplastic resin composition or the thermoplastic resin constituting the inner surface layer being 0.05 $cm^3 \cdot mm/(m^2 \cdot day \cdot mmHg)$ or less, a water vapor permeability coefficient at a temperature of 60° C. and a relative humidity of 100% of the thermoplastic resin composition constituting the outer surface layer being 10.0 $g \cdot mm/(m^2 \cdot 24\ h)$ or less, and the reinforcing layer comprising an organic fiber, and an inclination angle of the organic fiber with respect to a hose axial center being set to 49° or more and 61° or less.

Advantageous Effects of Invention

According to an embodiment of the present invention, because the inner surface layer is made of the thermoplastic resin composition or the thermoplastic resin, the outer surface layer is made of the thermoplastic resin composition, and the reinforcing layer is made of the organic fiber, it is advantageous to reduce the weight of a hose. Furthermore, because the outer surface layer is made of the thermoplastic resin composition, it is advantageous to improve flexibility of a hose compared to a case where the outer surface layer is made of a thermoplastic resin.

Because the oxygen permeability coefficient of the thermoplastic resin composition or the thermoplastic resin constituting the inner surface layer is in the range described above, permeation resistance to a refrigerant conveyed by the hose can be ensured adequately for practical use. Because the water vapor permeability coefficient of the thermoplastic resin composition constituting the outer surface layer is in the range described above, permeation resistance to moisture outside the hose can be ensured adequately for practical use.

Because the reinforcing layer is made of the organic fiber, it is further advantageous to reduce the weight of the hose. In addition, because the inclination angle of the organic fiber with respect to the hose axial center is set to 49° or more and 61° or less, the inner surface layer can maintain excellent permeation resistance to a medium due to suppression of change in dimension of the hose caused by internal pressure.

DESCRIPTION OF EMBODIMENTS

A hose for conveying a refrigerant according to embodiments of the present invention will be described below with reference to the drawings.

Figure 1:
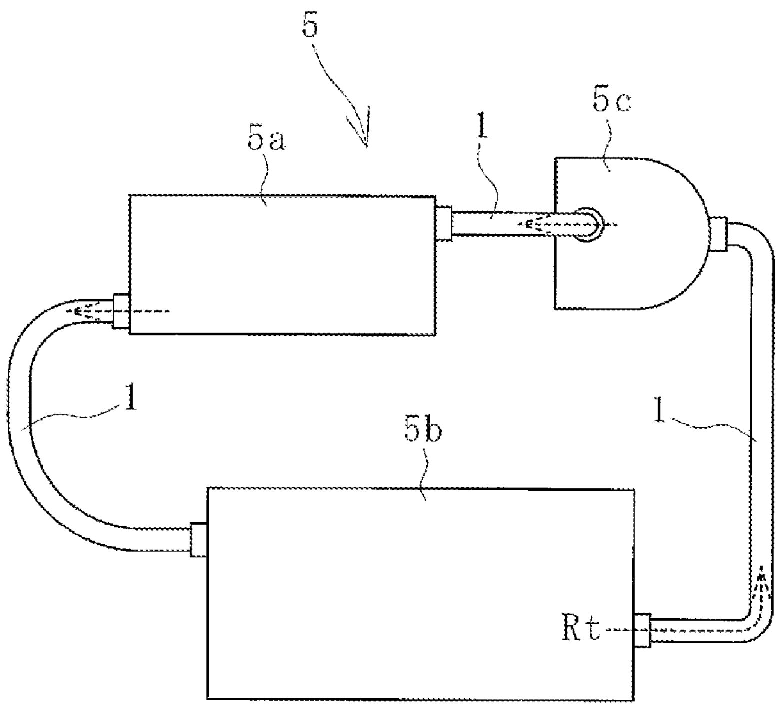
FIG. 1 is an explanatory diagram schematically illustrating an air conditioner for an automobile, the air conditioner using a hose for conveying a refrigerant according to an embodiment of the present invention.

A hose 1 for conveying a refrigerant according to an embodiment of the present invention (hereinafter, referred to as hose 1) illustrated in FIG. 1 is used in an air conditioner 5 (hereinafter, referred to as air conditioner 5) installed in an automobile. Specifically, the hose 1 is installed in between components 5*a*, 5*b*, 5*c* of an air conditioner 5 to form a circulation pathway that circulates a refrigerant Rt in each of the components 5*a*, 5*b*, and 5*c*.

Because the air conditioner 5 is installed in a narrow and limited space, the hose 1 is often attached to the components 5*a*, 5*b*, and 5*c* in a bent state, and the hose 1 may be in a bent state with a large curvature. Furthermore, the space for installing the air conditioner 5 may be in a high temperature environment at 70° C. or higher during engine operation. For example, the internal pressure during use of the hose 1 is 1.5 MPa or more and 4 MPa or less, and the inner diameter is 8 mm or more and 25 mm or less.

Examples of the refrigerant Rt include hydrofluorocarbon (HFC), hydrofluoroolefin (HFO), hydrocarbon, carbon dioxide, and ammonia. Examples of the HFC include R410A, R32, R404A, R407C, R507A, and R134a. Examples of the HFO include R1234yf, R1234ze, 1233zd, R1123, R1224yd, and R1336mzz. Examples of the hydrocarbon include methane, ethane, propane, propylene, butane, isobutane, hexafluoropropane, and pentane.

Figure 2:
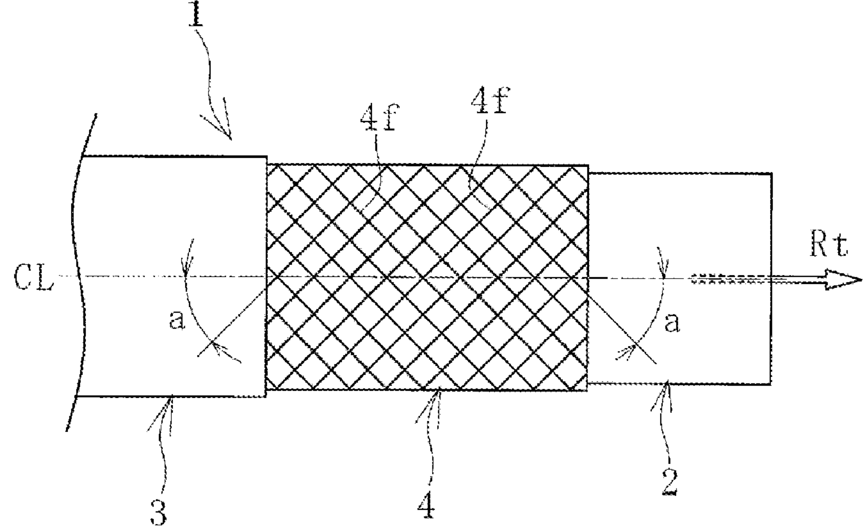
FIG. 2 is an explanatory diagram illustrating a partial cutout of a hose for conveying a refrigerant according to an embodiment of the present invention.
Figure 3:
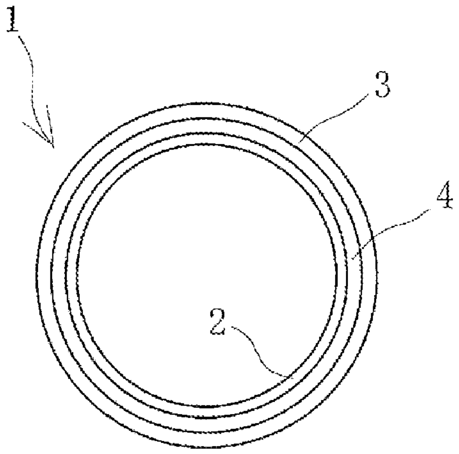
FIG. 3 is a traverse cross-sectional view of the hose in FIG. 2.

As illustrated in FIGS. 2 and 3, the hose 1 includes an inner surface layer 2, a reinforcing layer 4, and an outer surface layer 3, which are layered coaxially and sequentially from an inner circumferential side. Note that a dot-dash line CL in the drawings represents an axial center of a hose 1. In this embodiment, a reinforcing layer 4 having a braided structure is employed, a spiral structure may be employed as in the embodiment exemplified by FIG. 4 that is described below.

The inner surface layer 2 is disposed on an innermost circumferential side of the hose 1 and brought into direct contact with the refrigerant Rt. Thus, the inner surface layer 2 employs an adequate material taking permeation resistance to the refrigerant Rt, durability, and the like into consideration. In this embodiment, the inner surface layer 2 is made of the thermoplastic resin composition A including a sea-island structure including a matrix containing a thermoplastic resin and a domain containing an elastomer. The inner surface layer 2 may be made of a thermoplastic resin D. The inner surface layer 2 may have a single layer structure including a layer made of the thermoplastic resin composition A or the thermoplastic resin D, or may have a multi-layered structure in which a layer made of the thermoplastic resin composition A and a layer made of the thermoplastic resin D.

The oxygen permeability coefficient at a temperature of 21° C. and a relative humidity of 50% of the thermoplastic resin composition A and the thermoplastic resin D is 0.05 $cm^3 \cdot mm/(m^2 \cdot day \cdot mmHg)$. This oxygen permeability coefficient is more preferably 0.03 $cm^3 \cdot mm/(m^2 \cdot day \cdot mmHg)$ or less, and even more preferably 0.02 $cm^3 \cdot mm/(m^2 \cdot day \cdot mmHg)$ or less.

When the oxygen permeability coefficient is too high, the refrigerant Rt in the hose 1 permeates the material constituting the hose 1 and easily leaks outside the hose. By using a material having an oxygen permeability coefficient within the range described above as the inner surface layer 2, leakage of the refrigerant Rt to outside of the hose (outside the flow path) can be effectively prevented. That is, refrigerant permeation resistance adequate for practical use (difficulty for the refrigerant Rt to permeate) is readily ensured. This oxygen permeability coefficient is defined as an amount of oxygen that permeates a thickness of 1 mm per 1 $m^2$ of area per 1 mmHg of pressure in one day under stipulated temperature (21° C. in an embodiment of the present invention) and humidity (50% in an embodiment of the present invention) conditions.

The layer thickness of the inner surface layer 2 is, for example, preferably 0.4 mm or more and 1.6 mm or less. When the layer thickness is less than 0.4 mm, it is difficult to ensure the refrigerant permeation resistance, and when the layer thickness is more than 1.6 mm, it is difficult to ensure weight reduction and flexibility of the hose 1. To ensure adequate weight reduction and flexibility of the hose 1, the layer thickness of the inner surface layer 2 is more preferably 0.8 mm or less.

The outer surface layer 3 employs an adequate material taking permeation resistance to moisture in outside air, weather resistance, and the like into consideration. In this embodiment, the outer surface layer 3 is made of the thermoplastic resin composition B including a sea-island structure including a matrix containing a thermoplastic resin and a domain containing an elastomer. The water vapor permeability coefficient of the thermoplastic resin composition B at a temperature of 60° C. and a relative humidity of 100% is 10.0 $g \cdot mm/(m^2 \cdot 24\ h)$ or less. The water vapor permeability coefficient is more preferably 8.0 $g \cdot mm/(m^2 \cdot 24\ h)$ or less, and even more preferably 5.0 $g \cdot mm/(m^2 \cdot 24\ h)$ or less.

When the water vapor permeability coefficient is too high, the moisture in the outside air permeates the hose 1 and causes the moisture to be frozen inside the air conditioner 5. By using a material having a water vapor permeability coefficient within the range described above as the outer surface layer 3, infiltration of the moisture outside the hose into the hose inner portion (inner portion of flow path) can be effectively prevented. That is, moisture permeation resistance adequate for practical use (difficulty for moisture to permeate) is readily ensured. This water vapor permeability coefficient is defined as an amount of water vapor that permeates a thickness of 1 mm per 1 $m^2$ of area in 24 hours under stipulated temperature (60° C. in an embodiment of the present invention) and humidity (100% in an embodiment of the present invention) conditions.

The layer thickness of the outer surface layer 3 is, for example, preferably 0.2 mm or more and 1.8 mm or less. When the layer thickness is less than 0.2 mm, it is difficult to ensure the moisture permeation resistance, and when the layer thickness is more than 1.8 mm, it is difficult to ensure weight reduction and flexibility of the hose 1. To ensure adequate weight reduction and flexibility of the hose 1, the layer thickness of the outer surface layer 3 is more preferably 0.6 mm or less. To improve the flexibility of the hose 1, making the layer thickness of the outer surface layer 3 smaller is more effective than making the layer thickness of the inner surface layer 2 smaller, the layer thickness of the outer surface layer 3 is preferably made smaller than the layer thickness of the inner surface layer 2.

The oxygen permeability coefficient of the thermoplastic resin composition A and the thermoplastic resin D at a temperature of 21° C. and a relative humidity of 50% is preferably smaller than the oxygen permeability coefficient of the thermoplastic resin composition B. By this, it is advantageous to suppress an amount of leakage of the refrigerant Rt to outside the flow path to minimum and is advantageous to suppress deterioration in physical properties of materials of the reinforcing layer 4 and the outer surface layer 3 due to the refrigerant Rt.

The water vapor permeability coefficient of the thermoplastic resin composition B at a temperature of 60° C. and a relative humidity of 100% is preferably smaller than the water vapor permeability coefficients of the thermoplastic resin composition A and the thermoplastic resin D. By this, it is advantageous to suppress an amount of infiltration of the moisture outside the hose into the hose inner portion to minimum and is advantageous to suppress reduction in physical properties of materials of the reinforcing layer 4 and the inner surface layer 2 due to moisture.

The thermoplastic resin constituting the matrix of the thermoplastic resin composition A and the thermoplastic resin D are not limited as long as the oxygen permeability coefficients of the thermoplastic resin composition A and the thermoplastic resin D are within the ranges described above, but preferably include at least one type selected from the group consisting of a polyamide, a polyester, a polyvinyl alcohol, and a polyketone.

The thermoplastic resin constituting the matrix of the thermoplastic resin composition B is not limited as long as the water vapor permeability coefficient of the thermoplastic resin composition B is within the range described above, but preferably includes at least one type selected from the group consisting of polyamide, polyester, polyvinyl alcohol, polyketone, and polyolefin.

Examples of the polyamide include nylon 6, nylon 66, nylon 11, nylon 12, nylon 610, a nylon 6/66 copolymer, a nylon 6/12 copolymer, nylon 46, nylon 6T, nylon 9T, and nylon MXD6, and of these, nylon 6 is preferable.

Examples of the polyester include poly(ethylene terephthalate), poly(butylene terephthalate), poly(ethylene naphthalate), and poly(butylene naphthalate), and of these, poly (butylene terephthalate) is preferable.

Examples of the polyvinyl alcohol include polyvinyl alcohol, an ethylene-vinyl alcohol copolymer, and a modified ethylene-vinyl alcohol copolymer, and of these, an ethylene-vinyl alcohol copolymer is preferable.

Examples of the polyketone include ketone-ethylene copolymers, and ketone-ethylene-propylene terpolymers, and ketone-ethylene-propylene terpolymers are preferable.

The polyolefin may partially contain a modified polyolefin resin having a functional group such as maleic acid anhydride. Furthermore, the polyolefin may be a single type or a combination of plurality of types. Examples of the polyolefin include polypropylene, polyethylene, polybutene, polypentene, polyhexene, polyheptene, polyoctene, an ethylene-α-olefin-based copolymer, a poly-4-methylpentene-1 resin, and a propylene-α-olefin-based copolymer. The polyolefin is preferably polypropylene.

The elastomer constituting the domain of the thermoplastic resin composition A is not limited as long as the oxygen permeability coefficient of the thermoplastic resin composition A is within the range described above, but preferably includes at least one type selected from the group consisting of olefin-based elastomers and butyl-based elastomers.

The elastomer constituting the domain of the thermoplastic resin composition B is not limited as long as the water vapor permeability coefficient of the thermoplastic resin composition B is within the range described above, but preferably includes at least one type selected from the group consisting of olefin-based elastomers and butyl-based elastomers.

Examples of the olefin-based elastomer include an ethylene-α-olefin copolymer, an ethylene-ethyl acrylate copolymer, a maleic acid anhydride-modified ethylene-α-olefin copolymer, a maleic acid anhydride-modified ethylene-ethyl acrylate copolymer, and an ethylene-glycidyl methacrylate copolymer, and of these, a maleic acid anhydride-modified ethylene-α-olefin copolymer is preferable.

Examples of the butyl-based elastomer include butyl rubber, halogenated butyl rubber, isobutylene-para-methylstyrene copolymer rubber, halogenated isobutylene-para-methylstyrene copolymer rubber, and a styrene-isobutylene-styrene block copolymer, and of these, halogenated isobutylene-para-methylstyrene copolymer rubber is preferable.

The thermoplastic resin composition A most preferably includes nylon 6 in the matrix and a modified butyl rubber in the domain. Using, in the inner surface layer 2, a thermoplastic resin composition including a matrix of nylon 6 and a domain of modified butyl rubber is further advantageous to ensure excellent refrigerant permeation resistance and flexibility. Furthermore, the thermoplastic resin D most preferably contains a nylon 6, and this is advantageous to ensure excellent refrigerant permeation resistance.

The thermoplastic resin composition B most preferably includes nylon 12 in the matrix and a modified butyl rubber in the domain. Note that the modified butyl rubber refers to a halogenated isobutylene-para-methylstyrene copolymer rubber. Using, in the outer surface layer 3, a thermoplastic resin composition including a matrix of nylon 12 and a domain of modified butyl rubber is further advantageous to ensure excellent moisture permeation resistance and flexibility.

Note that, for example, the oxygen permeability coefficient varies depending on the type of the thermoplastic resin constituting the matrix among raw materials, and adjustment of a content of the elastomer constituting the domain. Thus, by selecting a thermoplastic resin having excellent refrigerant permeation resistance as the type of the thermoplastic resin and by controlling the content of the elastomer, the oxygen permeability coefficient can be set within the desired range described above. For example, the water vapor permeability coefficient varies depending on the type of the thermoplastic resin constituting the matrix among raw materials, and adjustment of a content of the elastomer constituting the domain. Thus, by selecting a thermoplastic resin having excellent water vapor permeation resistance as the type of the thermoplastic resin and by controlling the content of the elastomer, the water vapor permeability coefficient can be set within the desired range described above.

The reinforcing layer 4 is made by layering organic fibers **4*f* on an outer circumferential surface of an inner surface layer 2 as exemplified in FIGS. 2 and 3. The inclination angle a of the organic fiber 4***f* with respect to a hose axial center CL (braid angle a) is set to 49° or more and 61° or less, and the reinforcing layer 4 is formed by braiding the organic fibers 4*f* that are inclined in an opposite direction. The reinforcing layer 4 is not limited to one layer and may be a plurality of layers. The number of layers of the reinforcing layer 4 and the material of the organic fiber 4*f* are decided taking pressure resistance and the like required for the hose 1 into consideration.

Taking weight reduction of the hose 1 into consideration, the reinforcing layer 4 having a braided structure is preferably one layer. The layer thickness of the reinforcing layer 4 is, for example, preferably 0.2 mm or more and 2.0 mm or less, and to ensure weight reduction and flexibility of the hose 1, the layer thickness is more preferably 1.2 mm or less.

When the braid angle a of the organic fiber 4*f* is less than 49° and more than 61°, change in hose dimension (radius and length) becomes greater when an internal pressure is applied to the hose 1. As a result, the dimension of the inner surface layer 2 is also changed, and thus refrigerant permeation resistance may be deteriorated due to decrease in the layer thickness, or the risk of causing unnecessary deformation or cracks increases. Thus, the braid angle a is set to 49° or more and 61° or less, and more preferably 54° or more and 56° or less.

As the organic fiber 4*f*, for example, a polyester fiber, a polyamide fiber, an aramid fiber, a PBO fiber, a vinylon fiber, or a rayon fiber is used. The organic fiber 4*f* may be a monofilament or a multifilament obtained by intertwining a plurality of filaments.

Figure 4:
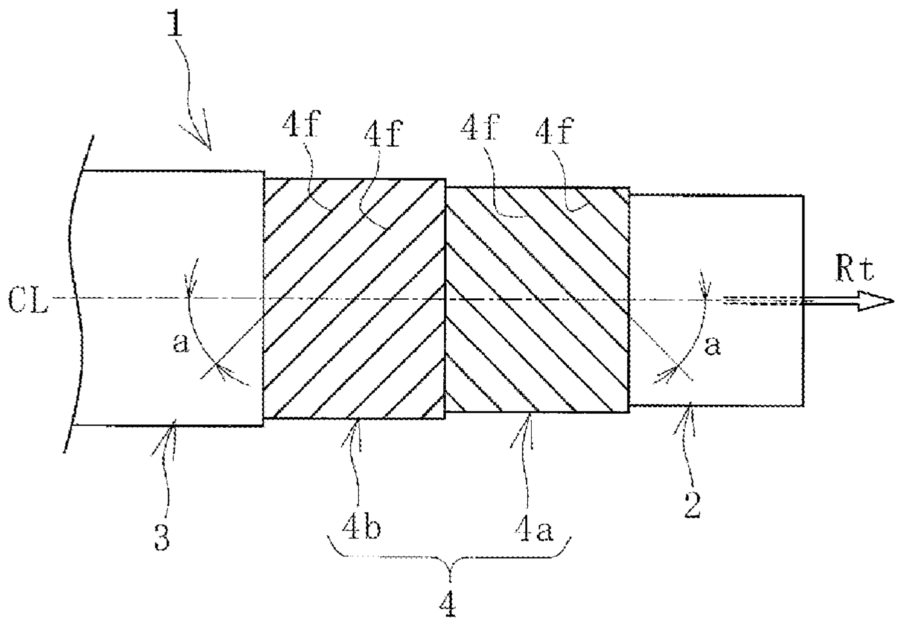
FIG. 4 is an explanatory diagram illustrating a partial cutout of a hose for conveying a refrigerant of another embodiment.

In the hose 1 of the embodiment exemplified in FIG. 4, the organic fiber 4*f* is formed by being wound spirally around an outer circumferential surface of an inner surface layer 2. The inclination angle a of the organic fiber 4*f* with respect to a hose axial center CL (braid angle a) is set to 49° or more and 61° or less. In a case of a reinforcing layer 4 having a spiral structure, basically even numbered layers of the reinforcing layer 4 are layered, and organic fibers 4*f* of vertically adjacent layers of the reinforcing layer 4 have inclinations that are opposite to each other. Taking weight reduction of the hose 1 into consideration, the reinforcing layer 4 having a spiral structure includes preferably two layers.

The 10% moduli at a temperature of 25° C. of the thermoplastic resin compositions A and B are preferably 10.0 MPa or less, and more preferably 6.0 MPa or less. The 10% modulus of 10.0 MPa or less is advantageous to ensure flexibility of the hose 1. The 10% modulus is a value measured in accordance with a method stipulated in JIS K 6301 "Physical Testing Method for Vulcanized Rubber".

An embodiment of the present invention achieves excellent flexibility of the hose 1 by using the thermoplastic resin compositions A and B having the sea-island structure, not by using an ordinary thermoplastic resin. The 10% moduli of the thermoplastic resin compositions A and B can be controlled by changing the contents of the elastomer contained in the thermoplastic resin compositions A and B (or in other words, changing the volume ratio of the domain). The thermoplastic resin compositions A and B preferably contain 50 vol. % or more of the domain, more preferably 50 vol. % or more and 80 vol. % or less, and even more preferably 65 vol. % or more and 75 vol. % or less. When the proportion of the domain is within this range, excellent flexibility of the hose 1 can be achieved while excellent refrigerant permeation resistance and moisture permeation resistance are maintained.

To improve flexibility of the hose 1, the 10% modulus of the thermoplastic resin composition B constituting the outer surface layer that is positioned farther from the neutral plane is preferably smaller than the 10% modulus of the thermoplastic resin composition A and the thermoplastic resin D constituting the inner surface layer 2, rather than lowering the flexural rigidity of the inner surface layer 2 that is positioned closer to the flexural center (neutral plane) of the hose 1.

That is, a case where the inner surface layer 2 is made of the thermoplastic resin composition A is more advantageous to improve flexibility of the hose 1 than a case where the inner surface layer 2 is made of the thermoplastic resin D. Note that, even in a case where the inner surface layer 2 is made of the thermoplastic resin D if the outer surface layer 3 is made of the thermoplastic resin composition B, flexibility adequate for practical use of the hose 1 can be ensured. As described above, forming the outer surface layer 3 by the thermoplastic resin composition B that is rich in flexibility (flexural rigidity is low) is significantly effective to improve flexibility of the hose 1.

The main component of the inner surface layer 2 is the thermoplastic resin composition A or the thermoplastic resin D, and the main component of the outer surface layer 3 is the thermoplastic resin composition B; however, the inner surface layer 2 and the outer surface layer 3 may contain another component in a range that does not impair the characteristics described above. For example, a known processing aid and/or viscosity stabilizer are preferably contained to improve extrudability of the thermoplastic resin compositions A and B and the thermoplastic resin D.

Because this hose 1 has the inner surface layer 2 made of the thermoplastic resin composition A or the thermoplastic resin D having a light weight and having an oxygen permeability coefficient within the range described above, permeation resistance to the refrigerant Rt conveyed by the hose 1 can be ensured adequately for practical use. Furthermore, because the outer surface layer 3 is made of the thermoplastic resin composition B that has a light weight, has the water vapor permeability coefficient within the range described above, and is rich in flexibility, permeation resistance to moisture outside the hose can be ensured adequately for practical use. Because the outer surface layer 3 is made of the thermoplastic resin composition B, it is advantageous to improve flexibility of the hose 1 compared to a case where the outer surface layer 3 is made of an ordinary thermoplastic resin.

In addition, because the reinforcing layer 4 is made of the organic fiber 4*f*, it is further advantageous to reduce the weight of the hose 1. Furthermore, because the inclination angle with respect to the hose axial center of the organic fiber 4*f* is set to 49° or more and 61° or less, even when a large internal pressure is applied to the hose 1, change in the hose dimension is adequately suppressed, and good refrigerant permeation resistance by the inner surface layer 2 can be maintained.

When the inner surface layer 2, the outer surface layer 3, and the reinforcing layer 4 satisfy all the specifications described above, the hose 1 achieves excellent permeation resistance to the refrigerant Rt and the moisture outside the hose and achieves light weight, good flexibility, and excellent handleability. Because arrangement of components 5*a*, 5*b*, and 5*c* of the air conditioner 5 are decided in advance in a narrow space for installment, when the hose 1 has excellent flexibility, handling of the hose 1 becomes easy, and handleability is remarkably improved.

The permeation resistance to the refrigerant Rt adequate for practical use of the hose 1 means the amount of refrigerant permeation of the hose 1 being 3 kg/($m^2$·year) or less, preferably 1.5 kg/($m^2$·year) or less, and more preferably 1.0 kg/($m^2$·year) or less. When the amount of refrigerant permeation is too high, the refrigerant Rt in the hose 1 permeates the material constituting the hose 1 and easily leaks outside the hose 1. The amount of refrigerant permeation of the hose 1 is defined as an amount of permeation of the refrigerant Rt (Freon HFO-1234yf) per 1 $m^2$ of inner surface area of the hose 1 in 1 year under a stipulated temperature (80±2° C.).

The mass per 1 $m^2$ of the outer surface area of the hose 1 is, for example, 3000 g/$m^2$ or less, preferably 2000 g/$m^2$ or less, and more preferably 1700 g/$m^2$ or less. By setting the mass per 1 $m^2$ of the outer surface area of the hose 1 to within this range, adequate weight reduction can be attempted.

The permeation resistance to moisture outside the hose 1 adequate for practical use means the amount of moisture permeation of the hose 1 being 3.0 mg/(240 h·$cm^2$) or less, preferably 1.6 mg/(240 h·$cm^2$) or less, and more preferably 1.0 mg/(240 h·$cm^2$) or less. When the amount of moisture permeation is too high, the moisture in the outside air permeates the hose 1 and causes the moisture to be frozen inside the air conditioner 5. The amount of moisture permeation of the hose 1 is defined as an amount of moisture permeation per 1 $cm^2$ of inner surface area of the hose 1 in 240 hours under stipulated temperature (50° C.) and humidity (relative humidity 95%) conditions.

An adhesive layer is optionally interposed between the inner surface layer 2 and the reinforcing layer 4 and/or the reinforcing layer 4 and the outer surface layer 3; however, an adhesive layer is preferably interposed. The adhesive layer can be formed by, for example, a urethane-based adhesive, an epoxy-based adhesive, an acrylic-based adhesive, a modified silicon-based adhesive, and an acid-modified polyolefin-based adhesive.

The manufacturing method of the hose 1 is not particularly limited, and a known ordinary manufacturing method can be used. For example, an inner surface layer 2 is formed by extrusion-molding a material of the inner surface layer 2 into a tube shape, and a reinforcing layer 4 is formed by braiding organic fibers **4*f* on an outer circumferential surface of the inner surface layer 2. Then, an outer surface layer 3 is formed by extrusion-molding a material of the outer surface layer 3 into a tube shape to cover an outer circumferential surface of the reinforcing layer 4**.

EXAMPLES

As listed in Table 1, for a test sample S of each of the 12 types of hoses having different specifications (Examples 1 to 7 and Comparative Examples 1 to 5), the following "refrigerant permeation resistance", "water vapor permeation resistance", "flexibility", and "weight reduction" were evaluated. The inner diameter of each test sample S was 12 mm, which was common. The evaluation results are indicated in Table 1.

TABLE 1-1

| | | Examples | | | | | | |
|---|---|---|---|---|---|---|---|---|
| | | 1 | 2 | 3 | 4 | 5 | 6 | 7 |
| Inner surface layer | Material | A2 | A3 | ← | D | D + A1 | A3 | A3 |
| | Oxygen permeability coefficient | 0.01 | ← | ← | 0.001 | 0.0018 | 0.01 | 0.01 |
| | Layer thickness (mm) | 0.8 | 0.4 | 1.6 | 0.5 | 0.7 | 0.8 | 0.4 |
| Reinforcing layer | Material | Polyester | ← | ← | ← | ← | ← | ← |
| | Layer thickness (mm) | 1.0 | 0.5 | 0.4 | 0.5 | ← | ← | ← |
| | Inclination angle a (°) | 55 | ← | ← | ← | ← | ← | ← |
| | Structure | Spiral | Braided | ← | ← | ← | ← | ← |
| | Number of layers | 2 | 1 | ← | ← | ← | ← | ← |
| Outer surface layer | Material | B1 | B3 | ← | ← | B2 | B3 | F |
| | Water vapor permeability coefficient | 3.2 | 3 | ← | ← | 3.2 | ← | 1.8 |
| | Layer thickness (mm) | 0.6 | 1.6 | 0.2 | 0.3 | ← | ← | 1.8 |
| Refrigerant permeation resistance | | ○ | ○ | ○ | ○ | ○ | ○ | ○ |
| Moisture permeation resistance | | ○ | ○ | ○ | ○ | ○ | ○ | ○ |
| Flexibility | | ○ | ○ | ○ | ○ | ○ | ○ | ○ |
| Weight reduction | | ○ | ○ | ○ | ○ | ○ | ○ | ○ |
| Overall determination | | ○ | ○ | ○ | ○ | ○ | ○ | ○ |

TABLE 1-2

| | | Comparative Example | | | | |
|---|---|---|---|---|---|---|
| | | 1 | 2 | 3 | 4 | 5 |
| Inner surface layer | Material | C + rubber 1 | A3 | ← | ← | ← |
| | Oxygen permeability coefficient | 0.0307 | 0.01 | ← | ← | ← |
| | Layer thickness (mm) | 1.6 | 0.8 | ← | 0.7 | 0.8 |
| Reinforcing layer | Material | Polyester | ← | ← | ← | Steel wire |
| | Layer thickness (mm) | 1.0 | 0.5 | ← | ← | ← |
| | Inclination angle a (°) | 56 | 48 | 62 | 55 | ← |
| | Structure | Spiral | Braided | ← | ← | ← |
| | Number of layers | 2 | 1 | ← | ← | ← |
| Outer surface layer | Material | Rubber 2 | B3 | ← | E | B1 |
| | Water vapor permeability coefficient | 6.6 | 2.8 | ← | 28.6 | 3.2 |
| | Layer thickness (mm) | 1.0 | 0.3 | ← | 0.5 | 0.3 |
| Refrigerant permeation resistance | | ○ | x | x | ○ | ○ |
| Moisture permeation resistance | | ○ | ○ | ○ | x | ○ |

TABLE 1-2-continued

| | Comparative Example | | | | |
|---|---|---|---|---|---|
| | 1 | 2 | 3 | 4 | 5 |
| Flexibility | ○ | ○ | ○ | ○ | ○ |
| Weight reduction | x | ○ | ○ | ○ | x |
| Overall determination | x | x | x | x | x |

The material (D+A1) of the inner surface layer of Example 5 in Table 1 means a two layer structure in which a layer made of the material A1 is layered on an outer circumferential surface of a layer made of the material D, and the layer thickness thereof of 0.7 mm is made up of 0.3 mm of the layer made of the material D and 0.4 mm of the layer made of the material A1. Furthermore, the material (C+rubber 1) of the inner surface layer of Comparative Example 1 means a two layer structure in which a layer made of the material rubber 1 is layered on an outer circumferential surface of a layer made of the material C, and the layer thickness thereof of 1.6 mm is made up of 0.2 mm of the layer made of the material C and 1.4 mm of the layer made of the material rubber 1.

Major compounding proportions of materials A1, A2, A3, B1, B2, B3, C, D, E, F, rubber 1, and rubber 2 in Table 1 are listed in Table 2. In addition to these compounding proportions, known ordinary additives are appropriately added as necessary.

TABLE 2-1

| | | Material | | | | | | |
|---|---|---|---|---|---|---|---|---|
| | | A1 | A2 | A3 | B1 | B2 | B3 | C |
| Nylon 6 | (parts by mass) | 64 | 45 | 36 | — | — | — | 70 |
| Nylon 6/12 | (parts by mass) | — | — | 11 | — | — | — | — |
| Nylon 11 | (parts by mass) | — | — | — | 35 | — | — | — |
| Nylon 12 | (parts by mass) | — | — | — | — | 35 | 29 | — |
| Polyester | (parts by mass) | — | — | — | — | — | — | — |
| Polypropylene | (parts by mass) | — | — | — | — | — | — | — |
| Modified polyolefin resin | (parts by mass) | — | — | — | — | — | — | 30 |
| Butyl-based rubber | (parts by mass) | 36 | 55 | 63 | 65 | 65 | 71 | — |
| EPDM | (parts by mass) | — | — | — | — | — | — | — |
| Volume fraction of rubber | (%) | 41 | 60 | 62 | 67 | 67 | 73 | — |

TABLE 2-2

| | | Material | | | | |
|---|---|---|---|---|---|---|
| | | D | E | F | Rubber 1 | Rubber 2 |
| Nylon 6 | (parts by mass) | 100 | — | — | — | — |
| Nylon 6/12 | (parts by mass) | — | — | — | — | — |
| Nylon 11 | (parts by mass) | — | — | — | — | — |
| Nylon 12 | (parts by mass) | — | — | — | — | — |
| Polyester | (parts by mass) | — | 100 | — | — | — |
| Polypropylene | (parts by mass) | — | — | 30 | — | — |
| Modified polyolefin resin | (parts by mass) | — | — | — | — | — |
| Butyl-based rubber | (parts by mass) | — | — | 70 | 45 | — |
| EPDM | (parts by mass) | — | — | — | 55 | 100 |
| Volume fraction of rubber | (%) | — | — | 70 | — | — |

Oxygen Permeability Coefficient

A sheet-shaped test piece cut out from the material of each of the test samples S was measured at a temperature of 21° C. and a relative humidity of 50% using OXTRAN 1/50, available from MOCON.

Water Vapor Permeability Coefficient

A sheet-shaped test piece cut out from the material of each of the test samples S was measured at a temperature of 60° C. and a relative humidity of 100% using a water vapor permeation tester, available from GTR Tec Corporation.

Refrigerant Permeation Resistance

The measurement was performed in accordance with SAE J2064 AUG2015. Each of the test samples S having a length of 1.07 m was filled with 70%±3% refrigerant (HFO-1234yf) per 1 $cm^3$ of the internal volume of the test sample S. This test sample S was allowed to stand in an atmosphere at 80° C. for 25 days, and an amount of reduction in the mass (amount of refrigerant permeation) per day [kg/day] was measured for a predetermined period (5 days to 7 days) at the end of the 25 day period. A numerical value obtained by dividing this amount of reduction by an inner surface area of the test sample S was converted into a numerical value per year to calculate an amount of refrigerant permeation [kg/($m^2$·year)]. A smaller numerical value of the amount of refrigerant permeation indicates superior refrigerant permeation resistance. A case where this numerical value was 3 or less can be evaluated as having refrigerant permeation resistance adequate for practical use. In Table 1, a case where this numerical value was 3 or less was indicated as ○, and a case where this numerical value was more than 3 was indicated as ×.

Moisture Permeation Resistance

Each of the test samples S that had been left in an oven at 50° C. for 5 hours was filled with a drying agent having a volume corresponding to 80% of the inner volume of the test sample S and was then sealed. The test sample S was then left to stand in an atmosphere with a temperature of 50° C. and a relative humidity of 95%, the mass of the drying agent was measured after 120 hours and after 360 hours, and the increase in the mass of the drying agent between 120 hours and 360 hours was calculated, the increase amount of the mass during the 240 hour period thereof was divided by the inner surface area of the test sample S, and the amount of moisture permeation [mg/(240 h·$cm^2$)] was calculated. A smaller numerical value of the amount of moisture permeation indicates superior moisture permeation resistance. A case where this numerical value was 3 or less can be evaluated as having moisture permeation resistance adequate for practical use. In Table 1, a case where this numerical value was 3 or less was indicated as ○, and a case where this numerical value was more than 3 was indicated as ×.

Flexibility

Figure 5:
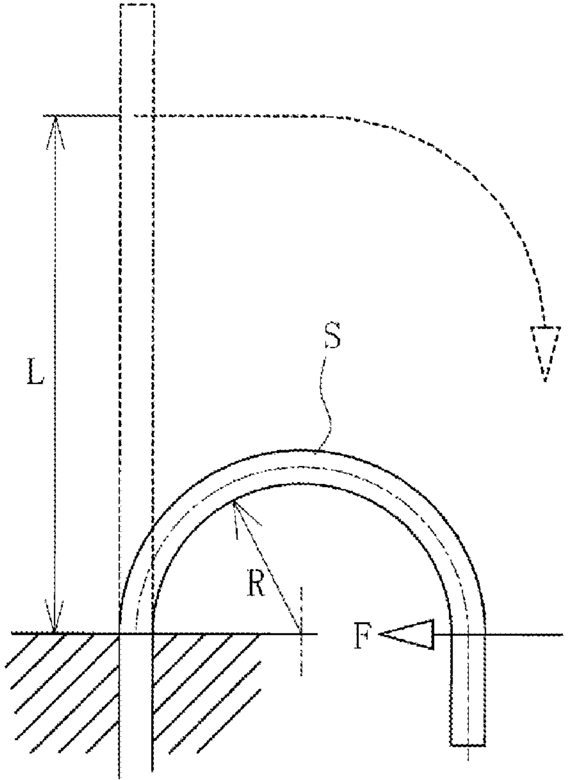
FIG. 5 is an explanatory diagram illustrating a measurement method of bending rigidity (flexibility) of a hose.

As exemplified in FIG. 5, one end in a length direction of each of the test samples S was fixed by a fixing tool such as a clamp, a spring balance was attached to the other end which was separated from the fixing position by a predetermined length L (120+hose outer diameter/2)×π[mm] and pulled, and the test sample S was bent in a semicircular arc-shape from a state illustrated by dashed lines to a state illustrated by solid lines. Then, a tensile force F measured by the spring balance that was pulling in a horizontal direction in a bent state with a radius R in a hose inner side of 120 mm was used as an indicator for evaluation. A smaller value of this tensile force F indicates ease in bending and superior flexibility of the test sample S. A case where this tensile force F was 20 N or less can be evaluated as having flexibility adequate for practical use. In Table 1, a case where this tensile force F was 20 N or less was indicated as ○, and a case where this tensile force F was more than 20 N was indicated as ×.

Weight Reduction

Each of the test samples S was evaluated as an index value with a mass per unit length of the test sample S of Comparative Example 1 being assigned a value of 100 as a reference. A smaller index value indicates a smaller mass per unit length and superior weight reduction. A case where this index value was 75 or less can be evaluated as achieving superior weight reduction. In Table 1, a case where this index value was 75 or less was indicated as ○, and a case where this index value was more than 75 was indicated as ×.

Overall Determination

A case where all the evaluation items, which were refrigerant permeation resistance, water vapor permeation resistance, flexibility, and weight reduction, achieved performances satisfying the criteria was indicated as ○, and the other cases were indicated as ×.

As is clear from the results in Table 1, Examples 1 to 7 achieved performances satisfying the criteria for all the evaluation items, which were refrigerant permeation resistance, water vapor permeation resistance, flexibility, and weight reduction, and achieved performances adequate for practical use.

REFERENCE SIGNS LIST

1 Hose for conveying of refrigerant
2 Inner surface layer
3 Outer surface layer
4 (4*a*, 4*b*) Reinforcing layer
4*f* Organic fiber
5 Air conditioner
5*a*, 5*b*, 5*c* Component
Rt Refrigerant

The invention claimed is:

1. A hose for conveying a refrigerant, the hose comprising: an inner surface layer and an outer surface layer disposed coaxially; and a reinforcing layer layered coaxially in between the inner surface layer and the outer surface layer, the inner surface layer comprising a thermoplastic resin composition or a thermoplastic resin, the thermoplastic resin composition having a sea-island structure comprising a matrix containing a thermoplastic resin and a domain containing an elastomer, the outer surface layer comprising a thermoplastic resin composition having a sea-island structure comprising a matrix containing a thermoplastic resin and a domain containing an elastomer, an oxygen permeability coefficient at a temperature of 21° C. and a relative humidity of 50% of the thermoplastic resin composition or the thermoplastic resin constituting the inner surface layer being 0.05 $cm^3 \cdot mm/(m^2 \cdot day \cdot mmHg)$ or less, a water vapor permeability coefficient at a temperature of 60° C. and a relative humidity of 100% of the thermoplastic resin composition constituting the outer surface layer being 10.0 $g \cdot mm/(m^2 \cdot 24\ h)$ or less, and the reinforcing layer comprising an organic fiber, and an inclination angle of the organic fiber with respect to a hose axial center being set to 49° or more and 61° or less.

2. The hose for conveying a refrigerant according to claim 1, wherein the inner surface layer comprises the thermoplastic resin composition.

3. The hose for conveying a refrigerant according to claim 1, wherein the organic fiber is a polyester fiber, a polyamide fiber, an aramid fiber, a PBO fiber, a vinylon fiber, or a rayon fiber.

4. The hose for conveying a refrigerant according to claim 1, wherein the reinforcing layer has a braided structure comprising one layer, or has a spiral structure comprising two layers.

5. The hose for conveying a refrigerant according to claim 1, wherein the inner surface layer has a layer thickness of 0.4 mm or more and 1.6 mm or less, and the outer surface layer has a layer thickness of 0.2 mm or more and 1.8 mm or less.

6. The hose for conveying a refrigerant according to claim 1, wherein the inner surface layer and the outer surface layer are made of different materials, and the 10% modulus of a material constituting the outer surface layer is smaller than the 10% modulus of a material constituting the inner surface layer.

* * * * *